United States Patent
Chen et al.

(10) Patent No.: US 10,334,656 B2
(45) Date of Patent: Jun. 25, 2019

(54) STATE TRANSITION METHOD, USER EQUIPMENT, AND RADIO NETWORK CONTROLLER

(71) Applicant: Huawei Technologies Co., Ltd., Shenzhen, Guangdong (CN)

(72) Inventors: Jun Chen, Shanghai (CN); Xiaoxiao Zheng, Shanghai (CN); Lingli Pang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 54 days.

(21) Appl. No.: 15/587,688

(22) Filed: May 5, 2017

(65) Prior Publication Data

US 2017/0238360 A1 Aug. 17, 2017

Related U.S. Application Data

(63) Continuation of application No. PCT/CN2014/090656, filed on Nov. 7, 2014.

(51) Int. Cl.
*H04W 76/27* (2018.01)
*H04W 72/08* (2009.01)
(Continued)

(52) U.S. Cl.
CPC .......... *H04W 76/27* (2018.02); *H04W 72/08* (2013.01); *H04W 80/08* (2013.01); *H04W 88/02* (2013.01); *H04W 88/12* (2013.01); *H04W 92/10* (2013.01)

(58) Field of Classification Search
CPC .............................. H04W 76/27; H04W 72/08
See application file for complete search history.

(56) References Cited

U.S. PATENT DOCUMENTS

2008/0253312 A1* 10/2008 Park .................. H04W 76/38
370/311
2009/0124212 A1* 5/2009 Islam ................ H04W 76/046
455/70
(Continued)

FOREIGN PATENT DOCUMENTS

CN 102695202 A 9/2012
CN 104105153 A 10/2014
(Continued)

OTHER PUBLICATIONS

"3rd Generation Partnership Project; Technical Specification Group Radio Access Network; Universal Terrestrial Radio Access Network (UTRAN); General Description; Stage 2 (Release 12)"; 3GPP TS 25.300 V12.2.0; Sep. 2014; 12 pages.
(Continued)

*Primary Examiner* — Gary Mui

(57) ABSTRACT

The present invention discloses a state transition method, user equipment, and a radio network controller. The user equipment includes: a receiving unit, configured to receive state transition indication information and information about a target RRC state that are sent by a radio network controller (RNC), where the state transition indication information is used for instructing the user equipment to perform enhanced state transition; and a transition unit, configured to enable the user equipment to transit from a current RRC state to the target RRC state according to the state transition indication information.

20 Claims, 7 Drawing Sheets

(51) Int. Cl.
*H04W 80/08* (2009.01)
*H04W 88/02* (2009.01)
*H04W 88/12* (2009.01)
*H04W 92/10* (2009.01)

(56) References Cited

U.S. PATENT DOCUMENTS

| | | | | | |
|---|---|---|---|---|---|
| 2011/0086656 | A1* | 4/2011 | Zhou | | H04W 8/24 |
| | | | | | 455/507 |
| 2012/0264416 | A1* | 10/2012 | Pica | | H04W 52/0254 |
| | | | | | 455/422.1 |
| 2012/0294157 | A1* | 11/2012 | Guo | | H04L 43/10 |
| | | | | | 370/251 |
| 2013/0028084 | A1* | 1/2013 | Aoyagi | | H04W 52/0235 |
| | | | | | 370/230 |
| 2013/0070728 | A1* | 3/2013 | Umatt | | H04W 36/0022 |
| | | | | | 370/331 |
| 2013/0215831 | A1* | 8/2013 | Pang | | H04L 1/0004 |
| | | | | | 370/328 |
| 2013/0267213 | A1* | 10/2013 | Hsu | | H04W 52/0232 |
| | | | | | 455/418 |
| 2014/0022978 | A1 | 1/2014 | Chen et al. | | |
| 2014/0051415 | A1* | 2/2014 | Ekici | | H04W 76/27 |
| | | | | | 455/418 |
| 2014/0057639 | A1 | 2/2014 | Nanjaiah | | |
| 2014/0105180 | A1* | 4/2014 | Grant | | H04W 36/30 |
| | | | | | 370/332 |
| 2015/0043460 | A1* | 2/2015 | Hannu | | H04W 52/0216 |
| | | | | | 370/329 |
| 2015/0092679 | A1* | 4/2015 | Mouzawak | | H04W 76/27 |
| | | | | | 370/329 |
| 2015/0296459 | A1* | 10/2015 | Tabatabaei Yazdi | | |
| | | | | | H04W 76/27 |
| | | | | | 370/311 |
| 2015/0334754 | A1* | 11/2015 | Lei | | H04W 8/005 |
| | | | | | 455/422.1 |
| 2015/0365856 | A1* | 12/2015 | Krishnamoorthy | | H04W 76/27 |
| | | | | | 370/331 |

FOREIGN PATENT DOCUMENTS

| | | |
|---|---|---|
| EP | 2061192 A1 | 5/2009 |
| EP | 2683208 A1 | 1/2014 |

OTHER PUBLICATIONS

"3rd Generation Partnership Project; Technical Specification Group Radio Access Network; Radio Resource Control (RRC); Protocol Specification (Release 12)"; 3GPP TS 25.331 V12.3.0; Sep. 2014; 2,204 pages.

* cited by examiner

STATE TRANSITION METHOD, USER EQUIPMENT, AND RADIO NETWORK CONTROLLER

CROSS-REFERENCE TO RELATED APPLICATIONS

This application is a continuation of International Application No. PCT/CN2014/090656, filed on Nov. 7, 2014, the disclosure of which is hereby incorporated by reference in its entirety.

TECHNICAL FIELD

The present invention relates to the field of wireless communications technologies, and in particular, to a state transition method, user equipment, and a radio network controller.

BACKGROUND

In a Universal Mobile Telecommunications System (UMTS), a radio resource control (RRC) status of user equipment (UE) includes a connected state and an idle state. In the idle state, the UE may receive a broadcast or paging, but does not have an RRC connection to a network side. In the connected state, the UE may perform uplink and downlink data transmission. The connected state may include: a cell dedicated channel (CELL_DCH) state, a cell forward access channel (CELL_FACH) state, a cell paging channel (CELL_PCH) state, and a UMTS terrestrial radio access network (UTRAN) registration area paging channel (URA_PCH) state.

With the wide use of intelligent mobile phones and popularization of small-sized traffic, there are increasingly more users in the CELL_FACH state and the CELL_DCH state in the UMTS. For the network side, when the UE has data to transmit, it is configured that the UE is in the CELL_FACH state or the CELL_DCH state, and when data transmission of the UE is finished, the state of the UE transits to the CELL_PCH state or the URA_PCH state, to reduce power overheads of the UE.

Currently, a radio network controller (RNC) implements state transition of the UE by using RRC signaling. The state transition method is completed by using a reconfiguration process. However, with increasingly more small-sized traffic, state transition becomes increasingly frequent. Therefore, an increase in reconfiguration processes results in an increase in signaling overheads.

SUMMARY

Embodiments of the present invention provide a state transition method, user equipment, and a radio network controller, so as to reduce signaling overheads.

According to a first aspect, user equipment is provided, where the user equipment includes: a receiving unit, configured to receive state transition indication information and information about a target radio resource control (RRC) state that are sent by a radio network controller (RNC), where the state transition indication information is used for instructing the user equipment to perform enhanced state transition; and a transition unit, configured to enable the user equipment to transit from a current RRC state to the target RRC state according to the state transition indication information.

With reference to the first aspect, in a first possible implementation manner of the first aspect, the enhanced state transition is state transition performed in an enhancement mode, and in the enhancement mode, the transition unit is further configured to directly enable the user equipment to transit from the current RRC state to the target RRC state when the receiving unit receives the state transition indication information.

With reference to the first aspect or the first possible implementation manner of the first aspect, in a second possible implementation manner of the first aspect, the user equipment further includes: a sending unit, configured to send radio link control acknowledgement information to the RNC before the transition unit enables the user equipment to transit from the current RRC state to the target RRC state.

With reference to the first aspect or the first possible implementation manner of the first aspect, in a third possible implementation manner of the first aspect, the user equipment further includes: a sending unit, configured to: before the transition unit enables the user equipment to transit from the current RRC state to the target RRC state, send, to the RNC, signaling connection release indication information carrying an information element, wherein the information element represents that a signaling connection release indication cause is set to user equipment requested packet switch data session end.

With reference to the third possible implementation manner of the first aspect, in a fourth possible implementation manner of the first aspect, the receiving unit is further configured to receive radio link control acknowledgement information that is sent by the RNC according to the signaling connection release indication information.

With reference to any one of the first aspect, or the first to the fourth possible implementation manners of the first aspect, in a fifth possible implementation manner of the first aspect, the state transition indication information received by the receiving unit is carried by a bit.

With reference to any one of the first aspect, or the first to the fifth possible implementation manners of the first aspect, in a sixth possible implementation manner of the first aspect, the receiving unit is further configured to receive reconfiguration signaling sent by the RNC, and the reconfiguration signaling carries the state transition indication information and the information about the target RRC state.

With reference to any one of the first aspect, or the first to the fifth possible implementation manners of the first aspect, in a seventh possible implementation manner of the first aspect, the receiving unit is further configured to receive reconfiguration signaling or a broadcast message sent by the RNC, and the reconfiguration signaling or the broadcast message carries the state transition indication information, and the state transition indication information includes the information about the target RRC state.

With reference to any one of the first aspect, or the first to the seventh possible implementation manners of the first aspect, in an eighth possible implementation manner of the first aspect, the receiving unit is further configured to receive a target radio network temporary identifier sent by the RNC, and the user equipment further includes: an update unit, configured to update a current radio network temporary identifier with the target radio network temporary identifier.

According to a second aspect, a radio network controller is provided, including: a generation unit, configured to generate state transition indication information and information about a target radio resource control (RRC) state, where the state transition indication information is used for instructing user equipment to perform enhanced state transition; and a sending unit, configured to send the state transition indication information and the information about the target RRC state to the user equipment, so that the user equipment transits from a current RRC state to the target RRC state according to the state transition indication information.

With reference to the second aspect, in a first possible implementation manner of the second aspect, the radio network controller further includes: a receiving unit, configured to receive radio link control acknowledgement information that is sent by the user equipment before transiting from the current RRC state to the target RRC state.

With reference to the second aspect, in a second possible implementation manner of the second aspect, the radio network controller further includes: a receiving unit, configured to receive signaling connection release indication information carrying an information element sent by the user equipment before transiting from the current RRC state to the target RRC state, wherein the information element represents that a signaling connection release indication cause is set to user equipment requested packet switch data session end.

With reference to the second possible implementation manner of the second aspect, in a third possible implementation manner of the second aspect, the sending unit is further configured to send radio link control acknowledgement information to the user equipment according to the signaling connection release indication information.

With reference to any one of the second aspect, or the first to the third possible implementation manners of the second aspect, in a fourth possible implementation manner of the second aspect, the state transition indication information sent by the sending unit is carried by a bit.

With reference to any one of the second aspect, or the first to the fourth possible implementation manners of the second aspect, in a fifth possible implementation manner of the second aspect, the sending unit is further configured to send reconfiguration signaling to the user equipment, and the reconfiguration signaling carries the state transition indication information and the information about the target RRC state.

With reference to any one of the second aspect, or the first to the fourth possible implementation manners of the second aspect, in a sixth possible implementation manner of the second aspect, the sending unit is further configured to send reconfiguration signaling or a broadcast message to the user equipment, where the reconfiguration signaling or the broadcast message carries the state transition indication information, and the state transition indication information includes the information about the target RRC state.

With reference to any one of the second aspect, or the first to the sixth possible implementation manners of the second aspect, in a seventh possible implementation manner of the second aspect, the sending unit is further configured to send a target radio network temporary identifier to the user equipment.

According to a third aspect, a state transition method is provided, including: receiving state transition indication information and information about a target radio resource control (RRC) state that are sent by a radio network controller (RNC), where the state transition indication information is used for instructing user equipment to perform enhanced state transition; and transiting from a current RRC state to the target RRC state according to the state transition indication information.

With reference to the third aspect, in a first possible implementation manner of the third aspect, the enhanced state transition is state transition performed in an enhancement mode, and the transiting from a current RRC state to the target RRC state according to the state transition indication information includes: directly transiting, in the enhancement mode, from the current RRC state to the target RRC state when the state transition indication information is received.

With reference to the third aspect or the first possible implementation manner of the third aspect, in a second possible implementation manner of the third aspect, before the transiting from a current RRC state to the target RRC state according to the state transition indication information, the method further includes: sending radio link control acknowledgement information to the RNC.

With reference to the third aspect or the first possible implementation manner of the third aspect, in a third possible implementation manner of the third aspect, before the transiting from a current RRC state to the target RRC state according to the state transition indication information, the method further includes: sending, to the RNC, signaling connection release indication information carrying an information element, wherein the information element represents that a signaling connection release indication cause is set to user equipment requested packet switch data session end.

With reference to the third possible implementation manner of the third aspect, in a fourth possible implementation manner of the third aspect, the method further includes: receiving radio link control acknowledgement information that is sent by the RNC according to the signaling connection release indication information.

With reference to any one of the third aspect, or the first to the fourth possible implementation manners of the third aspect, in a fifth possible implementation manner of the third aspect, the state transition indication information is carried by a bit.

With reference to any one of the third aspect, or the first to the fifth possible implementation manners of the third aspect, in a sixth possible implementation manner of the third aspect, the receiving state transition indication information and information about a target RRC state that are sent by a radio network controller (RNC) includes: receiving reconfiguration signaling sent by the RNC, where the reconfiguration signaling carries the state transition indication information and the information about the target RRC state.

With reference to any one of the third aspect, or the first to the fifth possible implementation manners of the third aspect, in a seventh possible implementation manner of the third aspect, the receiving state transition indication information and information about a target RRC state that are sent by a radio network controller (RNC) includes: receiving reconfiguration signaling or a broadcast message sent by the RNC, where the reconfiguration signaling or the broadcast message carries the state transition indication information, and the state transition indication information includes the information about the target RRC state.

With reference to any one of the third aspect, or the first to the seventh possible implementation manners of the third aspect, in an eighth possible implementation manner of the third aspect, the method further includes: receiving a target radio network temporary identifier sent by the RNC; and updating a current radio network temporary identifier with the target radio network temporary identifier.

According to a fourth aspect, a state transition method is provided, including: generating state transition indication information and information about a target radio resource control (RRC) state, where the state transition indication information is used for instructing user equipment to perform enhanced state transition; and sending the state transition indication information and the information about the target RRC state to the user equipment, so that the user equipment transits from a current RRC state to the target RRC state according to the state transition indication information.

With reference to the fourth aspect, in a first possible implementation manner of the fourth aspect, the method further includes: receiving radio link control acknowledgement information that is sent by the user equipment before transiting from the current RRC state to the target RRC state.

With reference to the fourth aspect, in a second possible implementation manner of the fourth aspect, the method further includes: receiving signaling connection release indication information carrying an information element sent by the user equipment before transiting from the current RRC state to the target RRC state, wherein the information element represents that a signaling connection release indication cause is set to user equipment requested packet switch data session end.

With reference to the second possible implementation manner of the fourth aspect, in a third possible implementation manner of the fourth aspect, the method further includes: sending radio link control acknowledgement information to the user equipment according to the signaling connection release indication information.

With reference to any one of the fourth aspect, or the first to the third possible implementation manners of the fourth aspect, in a fourth possible implementation manner of the fourth aspect, the state transition indication information is carried by a bit.

With reference to any one of the fourth aspect, or the first to the fourth possible implementation manners of the fourth aspect, in a fifth possible implementation manner of the fourth aspect, the sending the state transition indication information and the information about the target RRC state to the user equipment includes: sending reconfiguration signaling to the user equipment, where the reconfiguration signaling carries the state transition indication information and the information about the target RRC state.

With reference to any one of the fourth aspect, or the first to the fourth possible implementation manners of the fourth aspect, in a sixth possible implementation manner of the fourth aspect, the sending the state transition indication information and the information about the target RRC state to the user equipment includes: sending reconfiguration signaling or a broadcast message to the user equipment, where the reconfiguration signaling or the broadcast message carries the state transition indication information, and the state transition indication information includes the information about the target RRC state.

With reference to any one of the fourth aspect, or the first to the sixth possible implementation manners of the fourth aspect, in a seventh possible implementation manner of the fourth aspect, the method further includes: sending a target radio network temporary identifier to the user equipment.

In the embodiments of the present invention, state transition indication information and a target RRC state are used to instruct user equipment to directly transit from a current RRC state to the target RRC state in an enhancement mode. In the embodiments of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
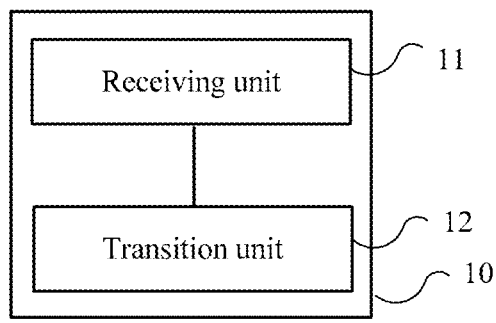
FIG. 1 is a schematic block diagram of user equipment according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global system for mobile communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, or the like.

User equipment (UE), also referred to as a mobile terminal (MT), mobile user equipment, and the like, may communicate with one or more core networks by using a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

State transition of user equipment is mainly completed by using a reconfiguration process. The state transition process may be initiated by a network side, for example, a radio network controller (RNC), or may be actively initiated by the UE.

When the state transition process is initiated by the RNC, by using state transition from CELL_DCH to CELL_FACH as an example, the reconfiguration process may be as follows:

sending physical channel reconfiguration signaling to the UE by the RNC, to indicate to the UE that a target RRC state of the state transition is CELL_FACH;

after receiving the physical channel reconfiguration signaling, replying, by the UE, to the physical channel reconfiguration signaling of the RNC; and transiting, by the UE, from state CELL_DCH to state CELL_FACH.

When the state transition process is initiated by the UE, by using state transition from CELL_DCH to CELL_FACH as an example, the state transition process may be as follows:

when detecting, at an application layer, that there is no packet switch (PS) data, sending, by the UE, signaling connection release indication (SCRI) to the RNC, and setting UE requested PS data session end as a signaling connection release indication cause in an information element; and after receiving the SCRI sent by the UE, repeating, by the RNC, the foregoing reconfiguration process, to complete state transition of the UE. To avoid repetition, details are not described herein again.

FIG. 1 is a schematic block diagram of user equipment according to an embodiment of the present invention. The user equipment 10 includes a receiving unit 11 and a transition unit 12.

The receiving unit 11 receives state transition indication information and information about a target RRC state that are sent by a radio network controller (RNC), where the state transition indication information is used for instructing the user equipment to perform enhanced state transition.

The transition unit 12 enables the user equipment 10 to transit from a current RRC state to the target RRC state according to the state transition indication information.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

It should be understood that, an RRC state of the UE may transit from a CELL_DCH state or a CELL_FACH state to a CELL_PCH state or a URA_PCH state. Specifically, this embodiment of the present invention may be applied to a case in which the UE transits from a CELL_FACH state to a CELL_PCH state, or transits from a CELL_FACH state to a URA_PCH state.

It should also be understood that, before receiving the state transition indication information, the UE may report an enhanced state transition capability to the RNC. Specifically, the UE may send uplink RRC signaling carrying an information element to the RNC. The information element carried in the uplink RRC signaling indicates that the UE can receive the state transition indication information and perform state transition according to the state transition indication information.

If state transition is initiated by the RNC, enhanced state transition may be described as follows.

Optionally, in another embodiment, the receiving unit 11 may receive reconfiguration signaling sent by the RNC. The reconfiguration signaling carries the state transition indication information and the information about the target RRC state.

Optionally, in another embodiment, the state transition indication information received by the receiving unit 11 is carried by a bit.

Specifically, if the state transition indication information is a bit, the state transition indication information is used for instructing the transition unit 12 to perform the enhanced transition process. It should be understood that, the state transition indication information may be indicated by using a bit. For example, if the bit is 1, the UE may perform state transition after receiving the reconfiguration signaling. It should be understood that, a specific format of the state transition indication information is not limited thereto in the present invention.

The enhanced state transition represents state transition performed in an enhancement mode. The state transition indication information is used for instructing the user equipment to transit from the current RRC state to the target RRC state in an enhancement mode.

Optionally, in another embodiment, the enhanced state transition is state transition performed in an enhancement mode, and in the enhancement mode, the transition unit 12 may directly transit the user equipment 10 from the current RRC state to the target RRC state when the receiving unit 11 receives the state transition indication information.

Optionally, in another embodiment, the receiving unit 11 may receive reconfiguration signaling or a broadcast message sent by the RNC. The reconfiguration signaling or the broadcast message carries the state transition indication information, and the state transition indication information includes the information about the target RRC state.

Specifically, the reconfiguration signaling or the broadcast message may include multiple indicator bits, the multiple indicator bits may represent the state transition indication information, and the multiple indicator bits may be used to carry the information about the target RRC state.

Figure 2:
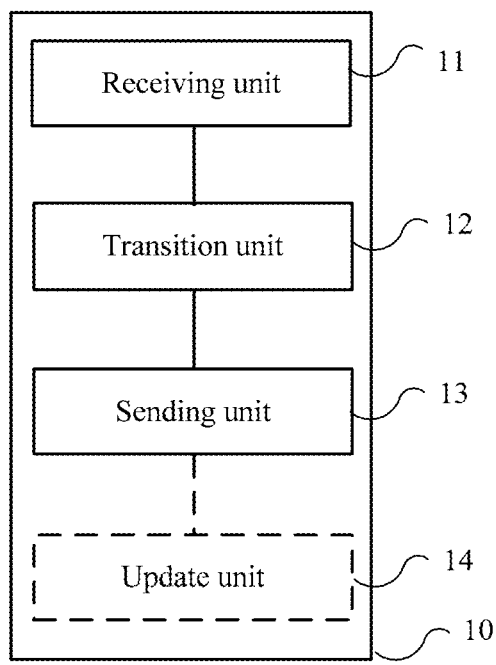
FIG. 2 is a schematic block diagram of user equipment according to another embodiment of the present invention.

FIG. 2 is a schematic block diagram of user equipment according to another embodiment of the present invention. In FIG. 2, same reference numbers are used for parts same as those in the apparatus in FIG. 1. Optionally, in another embodiment, the user equipment 10 may further include: a sending unit 13, configured to send radio link control acknowledgement information to the RNC before the transition unit enables the user equipment to transit from the current RRC state to the target RRC state.

Specifically, after the UE receives the state transition indication information and the information about the target RRC state, and before the UE transits from the current RRC state to the target RRC state, the sending unit 13 may send the radio link control acknowledgement (RLC ACK) information to the RNC. In this case, the transition unit 12 may directly enable the user equipment 10 to transit from the current RRC state to the target RRC state according to the state transition indication information and the target RRC state. The target RRC state may be a CELL_PCH state or a URA_PCH state.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, after reconfiguration signaling sent by an RNC is received, it is unnecessary to reply to the reconfiguration signaling of the RNC, reducing signaling overheads.

If state transition is initiated by the UE, enhanced state transition may be described as follows.

Optionally, in another embodiment, the sending unit 13 may send, to the RNC before the transition unit enables the user equipment 10 to transit from the current RRC state to the target RRC state, signaling connection release indication information carrying an information element, wherein the information element represents that a signaling connection release indication cause is set to user equipment requested packet switch data session end.

The information about the target RRC state received by the receiving unit 11 may be temporarily stored in the UE, and after the UE sends the signaling connection release indication (SCRI) information to the RNC, the transition unit 12 may enable the user equipment 10 to transit from the current RRC state to the target RRC state.

It should be understood that, when the UE detects, at an application layer, that there is no PS data, the sending unit 13 sends the SCRI to the RNC, and sets the UE requested PS data session end in a signaling connection release indication cause.

After the sending unit 13 sends the signaling connection release indication SCRI signaling to the RNC, in an embodiment, the transition unit 12 may directly enable the user equipment 10 to transit from the current RRC state to the target RRC state according to the target RRC state in the state transition indication information. The target RRC state may be a CELL_PCH state or a URA_PCH state.

Optionally, in another embodiment, the receiving unit 11 further receives radio link control acknowledgement RLC ACK information that is sent by the RNC according to the signaling connection release indication information.

Specifically, after the sending unit 13 sends the signaling connection release indication SCRI signaling to the RNC, if the receiving unit 11 receives the RLC ACK sent by the RNC, the user equipment 10 directly transits from the current RRC state to the target RRC state.

It should be understood that, the SCRI signaling may be sent on a signaling radio bearer 2 (SRB2) in a radio link control acknowledgement mode (RLC AM). After the sending end sends a data packet, it is considered, till the sending end receives an RLC ACK sent by the receiving end, that the data packet is successfully sent.

Optionally, in another embodiment, the receiving unit 11 may further receive a target radio network temporary identifier sent by the RNC. The user equipment 10 may further include: an update unit 14, configured to update a current radio network temporary identifier with the target radio network temporary identifier.

It should be understood that, a radio network temporary identifier (RNTI) may be at least one of a cell radio network temporary identifier (C-RNTI), an enhanced dedicated channel radio network temporary identifier (E-RNTI), or a high speed downlink shared channel radio network temporary identifier (H-RNTI).

Specifically, if the receiving unit 11 receives the target radio network temporary identifier, the update unit 14 updates the current radio network temporary identifier with the target radio network temporary identifier. It should be understood that, if not receiving the target radio network temporary identifier, the receiving unit 11 maintains the current radio network temporary identifier.

Optionally, in another embodiment, if the UE does not receive the RCL ACK and downlink data from the UE is received on a high speed shared control channel (HS-SCCH) or a high speed physical downlink shared channel (HS-PDSCH), after a maximum quantity of RLC retransmission times indicated by the SCRI is reached, the UE does not trigger an RLC reset process.

Optionally, in another embodiment, if the UE does not receive the RCL ACK and downlink data from the UE is not received on an FACH channel, an HS-SCCH channel, or an HS-PDSCH channel, after a maximum quantity of RLC retransmission times indicated by the SCRI is reached, the UE triggers an RLC reset process.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, the user equipment can directly perform state transition without waiting for an instruction that is sent by an RNC in a reconfiguration process.

Figure 3:
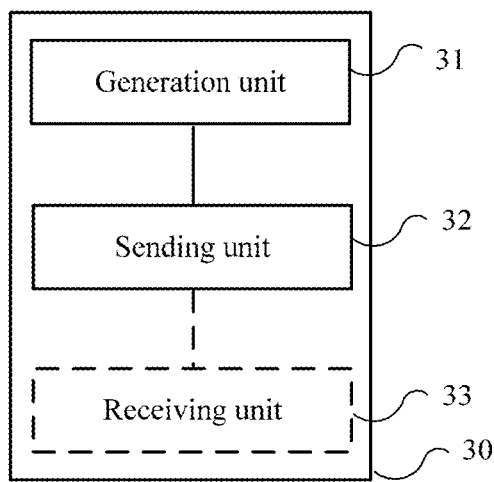
FIG. 3 is a schematic block diagram of a radio network controller according to an embodiment of the present invention.

FIG. 3 is a schematic block diagram of a radio network controller according to an embodiment of the present invention. The radio network controller in FIG. 3 may interact with the user equipment in FIG. 1 or FIG. 2. As shown in FIG. 3, the radio network controller 30 includes a generation unit 31 and a sending unit 32.

The generation unit 31 generates state transition indication information and information about a target radio resource control (RRC) state, where the state transition indication information is used for instructing user equipment to perform enhanced state transition.

The sending unit 32 sends the state transition indication information and the information about the target RRC state to the user equipment, so that the user equipment transits from a current RRC state to the target RRC state according to the state transition indication information.

In this embodiment of the present invention, state transition indication information and a target RRC state are used to instruct user equipment to directly transit from a current RRC state to the target RRC state in an enhancement mode.

In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

It should be understood that, an RRC state of the UE may transit from a CELL_DCH state or a CELL_FACH state to a CELL_PCH state or a URA_PCH state. Specifically, this embodiment of the present invention may be applied to a case in which the UE transits from a CELL CELL_FACH state to a CELL_PCH state, or transits from a CELL_FACH state to a URA_PCH state.

It should be understood that, the radio network controller may obtain a state transition capability reported by the UE. Specifically, the UE may send uplink RRC signaling carrying an information element to the RNC. The information element carried in the uplink RRC signaling indicates that the UE can receive the state transition indication information and perform state transition according to the state transition indication information.

If state transition is initiated by the RNC, enhanced state transition may be described as follows.

Optionally, in another embodiment, the sending unit 32 may send reconfiguration signaling to the user equipment, and the reconfiguration signaling carries the state transition indication information and the information about the target RRC state.

Optionally, in another embodiment, the state transition indication information sent by the sending unit 32 is carried by a bit.

Specifically, if the state transition indication information is a bit, the state transition indication information is used for instructing the user equipment to perform the enhanced transition process. It should be understood that, the state transition indication information may be indicated by using a bit. For example, if the bit is 1, the UE may perform state transition after receiving the reconfiguration signaling. It should be understood that, a specific format of the state transition indication information is not limited thereto in the present invention.

The enhanced state transition represents state transition performed in an enhancement mode. The state transition indication information is used for instructing the user equipment to transit from the current RRC state to the target RRC state in an enhancement mode.

Optionally, in another embodiment, the sending unit 32 may send reconfiguration signaling or a broadcast message to the user equipment, where the reconfiguration signaling or the broadcast message carries the state transition indication information, and the state transition indication information includes the information about the target RRC state.

Specifically, the reconfiguration signaling or the broadcast message may include multiple indicator bits, the multiple indicator bits may represent the state transition indication information, and the multiple indicator bits may be used to carry the information about the target RRC state.

Optionally, in another embodiment, the radio network controller 30 may further include: a receiving unit 33, configured to receive radio link control acknowledgement information that is sent by the user equipment before transiting from the current RRC state to the target RRC state.

In this embodiment of the present invention, state transition indication information and a target RRC state are used to instruct user equipment to directly transit from a current RRC state to the target RRC state in an enhancement mode.

In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, after reconfiguration signaling sent by an RNC is received, it is unnecessary to reply to the reconfiguration signaling of the RNC, reducing signaling overheads.

If state transition is initiated by the UE, enhanced state transition may be described as follows.

Optionally, in another embodiment, the receiving unit 33 may receive signaling connection release indication information carrying an information element sent by the user equipment before transiting from the current RRC state to the target RRC state, wherein the information element represents that a signaling connection release indication cause is set to user equipment requested packet switch data session end.

The information about the target RRC state sent by the sending unit 32 may be temporarily stored in the UE. After sending the signaling release indication SCRI information to the RNC, the UE may transit from the current RRC state to the target RRC state.

It should be understood that, when the UE detects, at an application layer, that there is no PS data, the user equipment sends the SCRI to the RNC, and sets the UE requested PS data session end in a signaling connection release indication cause.

Optionally, in another embodiment, the sending unit 32 may further send radio link control acknowledgement information to the user equipment according to the signaling connection release indication information.

It should be understood that, the SCRI signaling may be sent on an SRB2 in an RLC AM mode. After the sending end sends a data packet, it is considered, till the sending end receives an RLC ACK sent by the receiving end, that the data packet is successfully sent.

Optionally, in another embodiment, the sending unit 32 may further send a target radio network temporary identifier to the user equipment.

It should be understood that, a radio network temporary identifier RNTI may be at least one of a C-RNTI, an E-RNTI, or an H-RNTI.

Specifically, if the sending unit 32 sends the target radio network temporary identifier, the UE updates a current radio network temporary identifier with the target network temporary identifier. It should be understood that, if the sending unit 32 does not send the target radio network temporary identifier, the UE maintains the current radio network temporary identifier.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, the user equipment can directly perform state transition without waiting for an instruction that is sent by an RNC in a reconfiguration process.

Figure 4:
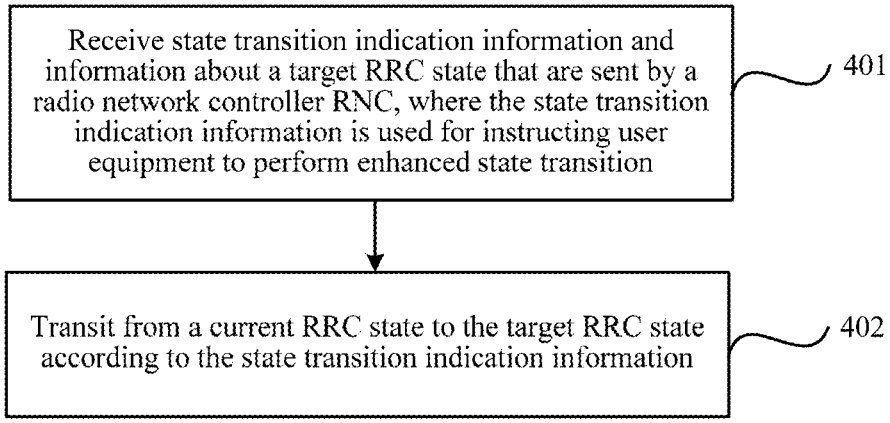
FIG. 4 is a schematic flowchart of a state transition method according to an embodiment of the present invention.

FIG. 4 is a schematic flowchart of a state transition method according to an embodiment of the present invention. The method shown in FIG. 4 may be implemented by the user equipment in FIG. 1 or FIG. 2. To avoid repetition, details are not described herein again. The method 400 includes the following steps.

401: Receive state transition indication information and information about a target RRC state that are sent by a radio network controller (RNC), where the state transition indication information is used for instructing user equipment to perform enhanced state transition.

402: Transit from a current RRC state to the target RRC state according to the state transition indication information.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

Optionally, in another embodiment, the enhanced state transition is state transition performed in an enhancement mode, and in 402, the user equipment may directly transit, in the enhancement mode, from the current RRC state to the target RRC state when receiving the state transition indication information.

Figure 5:
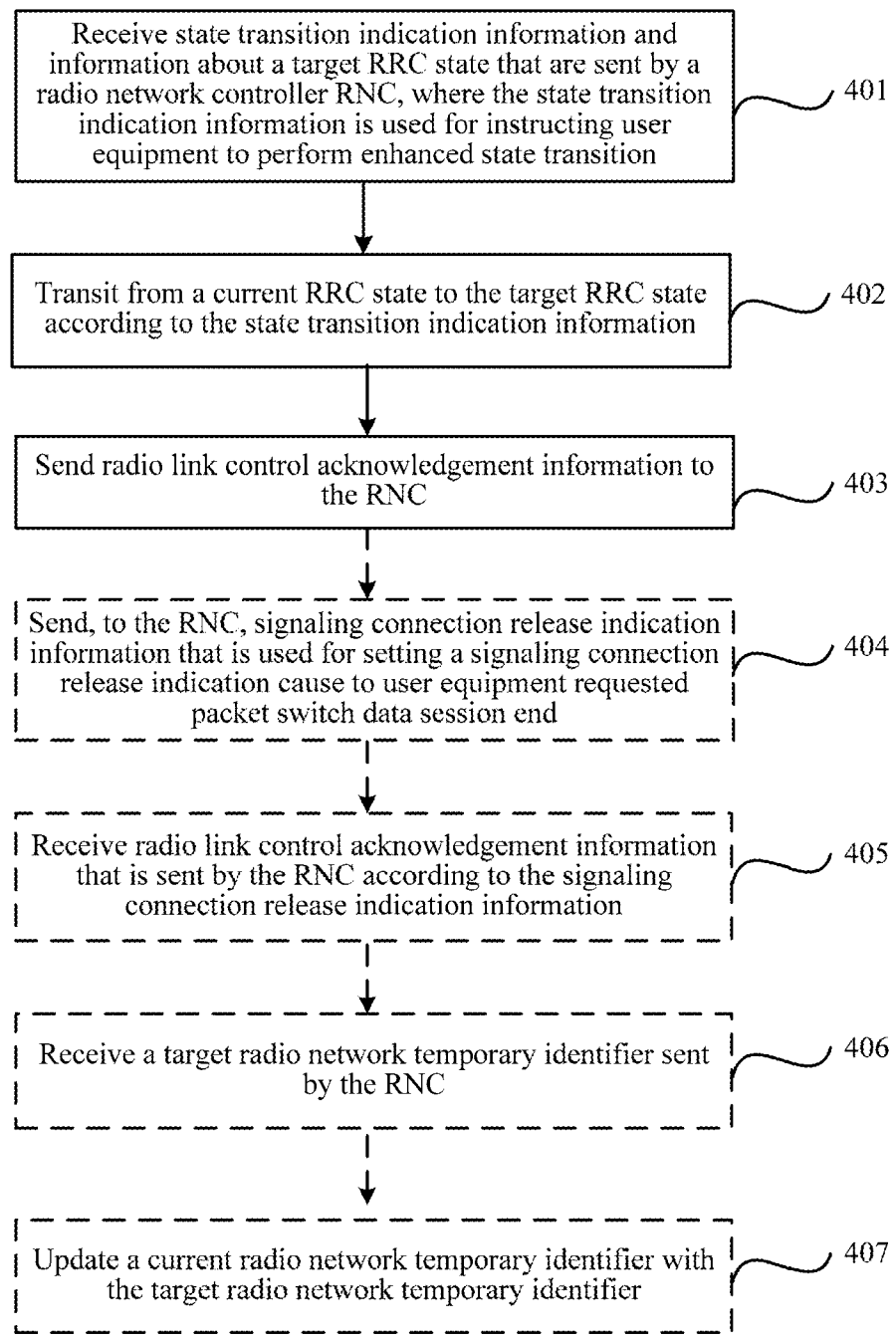
FIG. 5 is a schematic flowchart of a state transition method according to another embodiment of the present invention.

FIG. 5 is a schematic flowchart of a state transition method according to another embodiment of the present invention. In FIG. 5, a same reference number is used for a step same as that in FIG. 4.

Optionally, in another embodiment, before the transiting from a current RRC state to the target RRC state according to the state transition indication information, the method 400 may further include the following step: 403: Send radio link control acknowledgement information to the RNC.

Optionally, in another embodiment, before the transiting from a current RRC state to the target RRC state according to the state transition indication information, the method 400 further includes the following step: 404: Send, to the RNC, signaling connection release indication information carrying an information element, wherein the information element represents that a signaling connection release indication cause is set to user equipment requested packet switch data session end.

Optionally, in another embodiment, the method 400 may further include the following step: 405: Receive radio link control acknowledgement information that is sent by the RNC according to the signaling connection release indication information.

Optionally, in another embodiment, the state transition indication information is carried by a bit.

Optionally, in another embodiment, in 401, the user equipment may receive reconfiguration signaling sent by the RNC. The reconfiguration signaling carries the state transition indication information and the information about the target RRC state.

Optionally, in another embodiment, in 401, the user equipment may receive reconfiguration signaling or a broadcast message sent by the RNC. The reconfiguration signaling or the broadcast message carries the state transition indication information, and the state transition indication information includes the information about the target RRC state.

Optionally, in another embodiment, the method 400 may further include the following steps: 406: Receive a target radio network temporary identifier sent by the RNC.

407: Update a current radio network temporary identifier with the target radio network temporary identifier.

Figure 6:
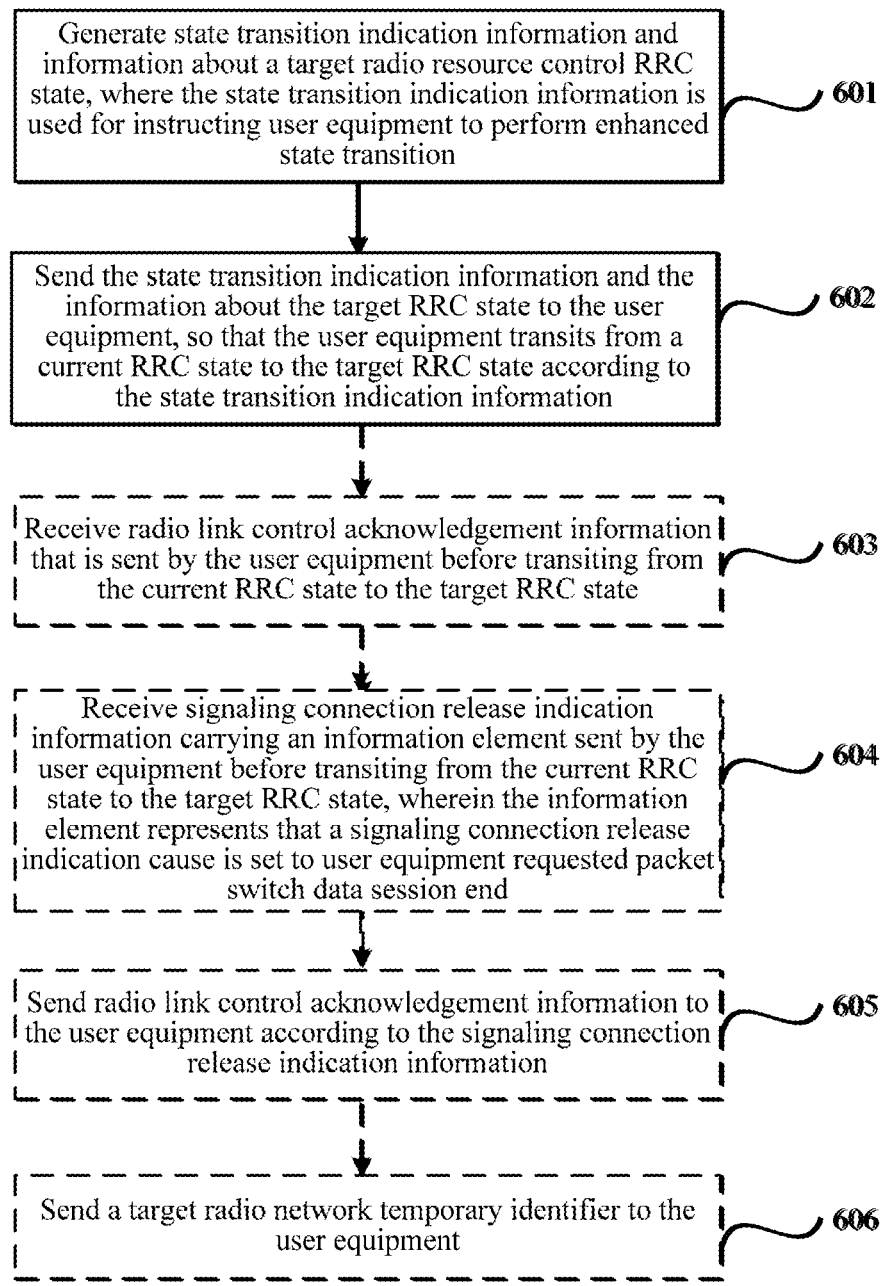
FIG. 6 is a schematic flowchart of a state transition method according to another embodiment of the present invention.

FIG. 6 is a schematic flowchart of a state transition method according to another embodiment of the present invention. The method in FIG. 6 may be implemented by the radio network controller in FIG. 3. The method 600 includes the following steps.

601: Generate state transition indication information and information about a target radio resource control (RRC) state, where the state transition indication information is used for instructing user equipment to perform enhanced state transition.

602: Send the state transition indication information and the information about the target RRC state to the user equipment, so that the user equipment transits from a current RRC state to the target RRC state according to the state transition indication information.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

Optionally, in another embodiment, the method 600 further includes the following step: 603: Receive radio link control acknowledgement information that is sent by the user equipment before transiting from the current RRC state to the target RRC state.

Optionally, in another embodiment, the method 600 further includes the following step: 604: Receive signaling connection release indication information carrying an information element sent by the user equipment before transiting from the current RRC state to the target RRC state, wherein the information element represents that a signaling connection release indication cause to user equipment requested packet switch data session end.

Optionally, in another embodiment, the method 600 may further include the following step: 605: Send radio link control acknowledgement information to the user equipment according to the signaling connection release indication information.

Optionally, in another embodiment, the state transition indication information is carried by a bit.

Optionally, in another embodiment, in 601, the radio network controller may send reconfiguration signaling to the user equipment, where the reconfiguration signaling carries the state transition indication information and the information about the target RRC state.

Optionally, in another embodiment, in 601, the radio network controller may send reconfiguration signaling or a broadcast message to the user equipment, where the reconfiguration signaling or the broadcast message carries the state transition indication information, and the state transition indication information includes the information about the target RRC state.

Optionally, in another embodiment, the method 600 may further include the following step: 606: Send a target radio network temporary identifier to the user equipment.

Figure 7:
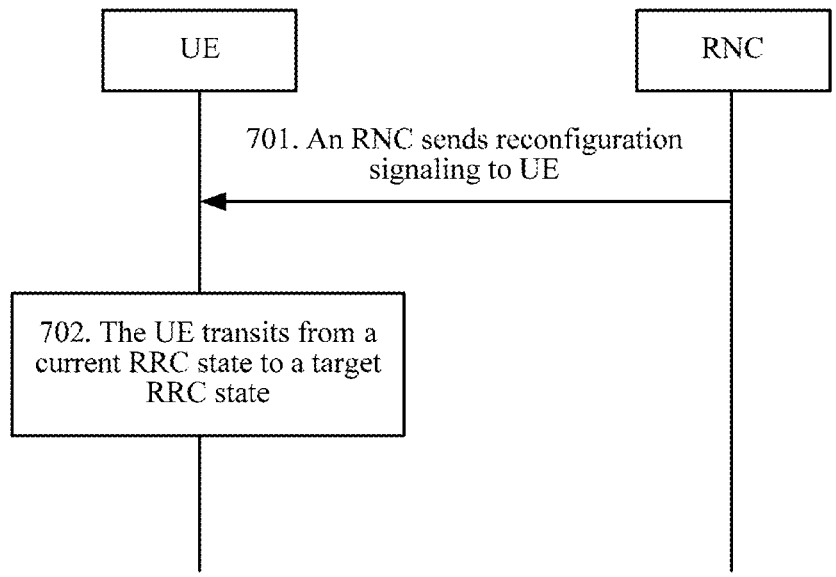
FIG. 7 is a schematic flowchart of a state transition process according to an embodiment of the present invention.

FIG. 7 is a schematic flowchart of a state transition process according to an embodiment of the present invention. In the process, state transition is initiated by an RNC.

701: An RNC sends reconfiguration signaling to UE.

The reconfiguration signaling carries a target RRC state and state transition indication information. The state transition indication information may be carried by a bit. The target RRC state may be CELL_PCH or URA_PCH. The state transition indication information is used for instructing the UE to perform enhanced state transition.

The reconfiguration signaling may further include a target radio network temporary identifier RNTI. The target RNTI may be at least one of a C-RNTI, an E-RNTI, or an H-RNTI.

702: The UE transits from a current RRC state to a target RRC state.

The UE may transit from the current RRC state to the target RRC state according to received information about the target RRC state. The UE may further update a current RNTI with the target RNTI. The current RRC state may be a CELL_FACH state.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, after reconfiguration signaling sent by an RNC is received, it is unnecessary to reply to the reconfiguration signaling of the RNC, reducing signaling overheads.

Figure 8:
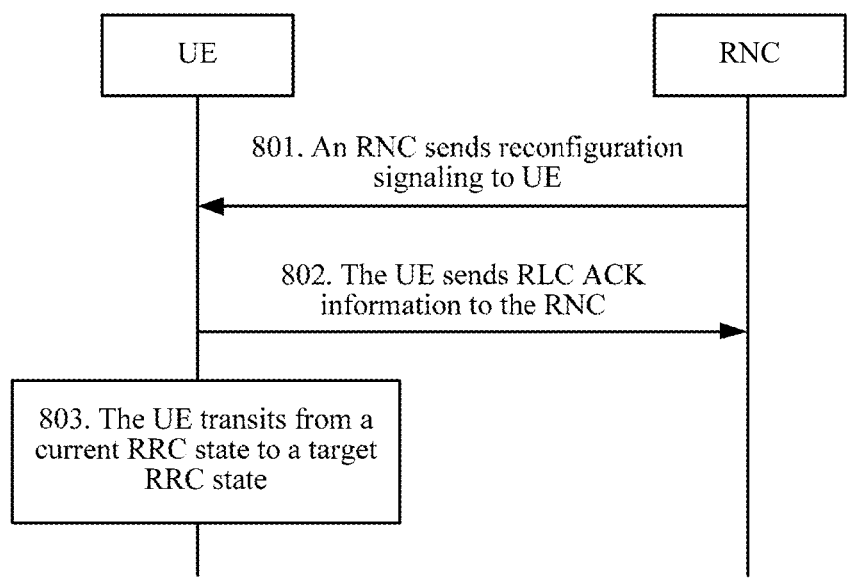
FIG. 8 is a schematic flowchart of a state transition process according to another embodiment of the present invention.

FIG. 8 is a schematic flowchart of a state transition process according to another embodiment of the present invention. In the process, state transition is initiated by an RNC.

801: An RNC sends reconfiguration signaling to UE.

The reconfiguration signaling carries a target RRC state and state transition indication information. The state transition indication information may be carried by a bit. The target RRC state may be CELL_PCH or URA_PCH. The state transition indication information is used for instructing the UE to perform enhanced state transition.

The reconfiguration signaling may further include a target radio network temporary identifier RNTI. The target RNTI may be at least one of a C-RNTI, an E-RNTI, or an H-RNTI.

802: The UE sends RLC ACK information to the RNC.

803: The UE transits from a current RRC state to a target RRC state.

The UE may transit from the current RRC state to the target RRC state according to received information about the target RRC state. The current RRC state may be a CELL_FACH state. The UE may further update a current RNTI with the target RNTI.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, after reconfiguration signaling sent by an RNC is received, it is unnecessary to reply to the reconfiguration signaling of the RNC, reducing signaling overheads.

Figure 9:
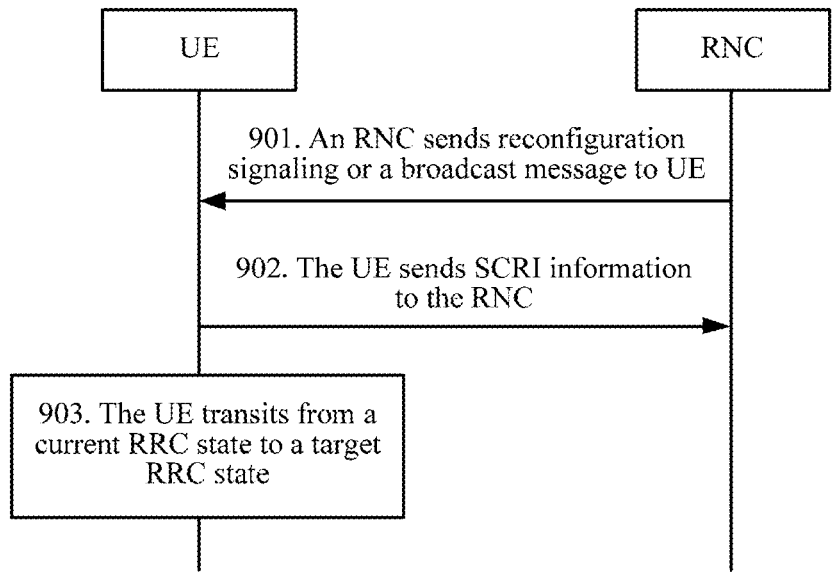
FIG. 9 is a schematic flowchart of a state transition process according to another embodiment of the present invention.

FIG. 9 is a schematic flowchart of a state transition process according to another embodiment of the present invention. In the process, state transition is initiated by UE.

901: An RNC sends reconfiguration signaling or a broadcast message to UE.

Specifically, the reconfiguration signaling or the broadcast message may include multiple indicator bits, the multiple indicator bits may represent state transition indication information, and the multiple indicator bits may be used to carry information about a target RRC state. The state transition indication information is used for instructing the user equipment to perform state transition in an enhancement mode.

The reconfiguration signaling may further include a target radio network temporary identifier RNTI. The target RNTI may be at least one of a C-RNTI, an E-RNTI, or an H-RNTI.

902: The UE sends SCRI information to the RNC.

When detecting, at an application layer, that there is no PS data, the UE sends the SCRI information to the RNC, and sets UE requested PS data session end in a signaling connection release indication cause.

903: The UE transits from a current RRC state to a target RRC state.

The UE may transit from the current RRC state to the target RRC state according to received information about the target RRC state. The current RRC state may be a CELL_FACH state. The UE may further update a current RNTI with the target RNTI.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, the user equipment can directly perform state transition without waiting for an instruction that is sent by an RNC in a reconfiguration process.

Figure 10:
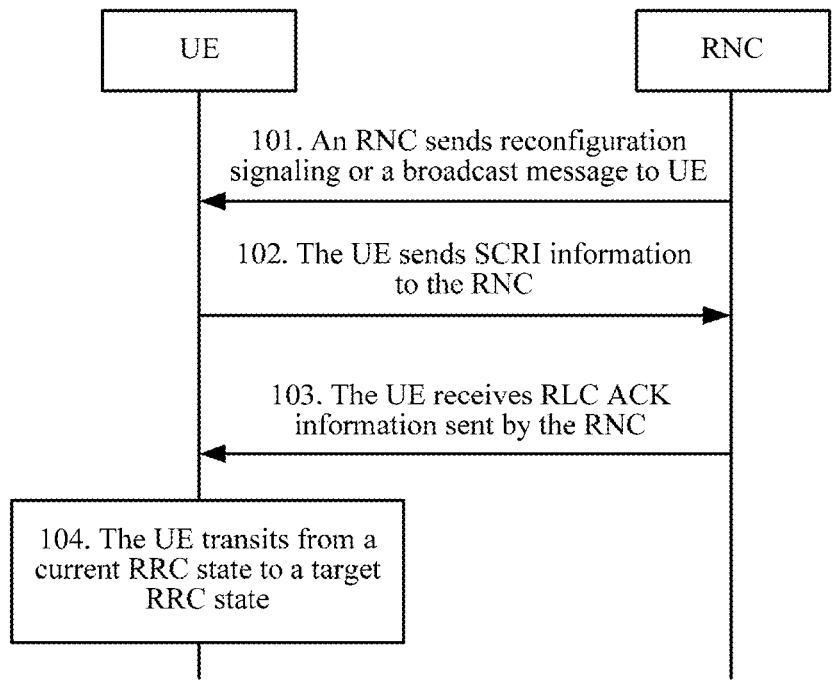
FIG. 10 is a schematic flowchart of a state transition process according to another embodiment of the present invention.

FIG. 10 is a schematic flowchart of a state transition process according to another embodiment of the present invention. In the process, state transition is initiated by UE.

101: An RNC sends reconfiguration signaling or a broadcast message to UE.

Specifically, the reconfiguration signaling or the broadcast message may include multiple indicator bits, the multiple indicator bits may represent state transition indication information, and the multiple indicator bits may be used to carry information about a target RRC state. The state transition indication information is used for instructing the user equipment to perform state transition in an enhancement mode.

The reconfiguration signaling may further include a target radio network temporary identifier RNTI. The target RNTI may be at least one of a C-RNTI, an E-RNTI, or an H-RNTI.

102: The UE sends SCRI information to the RNC.

When detecting, at an application layer, that there is no PS data, the UE sends the SCRI information to the RNC, and sets UE requested PS data session end in a signaling connection release indication cause.

Optionally, in another embodiment, if the UE does not receive an RCL ACK and downlink data from the UE is received on an FACH channel, an HS-SCCH channel, or an HS-PDSCH channel, after a maximum quantity of RLC retransmission times indicated by the SCRI is reached, the UE does not trigger an RLC reset process.

Optionally, in another embodiment, if the UE does not receive an RCL ACK and downlink data from the UE is not received on an FACH channel, an HS-SCCH channel, or an HS-PDSCH channel, after a maximum quantity of RLC retransmission times indicated by the SCRI is reached, the UE triggers an RLC reset process.

103: The UE receives RLC ACK information sent by the RNC.

It should be understood that, the SCRI signaling may be sent on an SRB2 in an RLC AM mode. After the sending end sends a data packet, it is considered, till the sending end receives an RLC ACK sent by the receiving end, that the data packet is successfully sent.

104: The UE transits from a current RRC state to a target RRC state.

The UE may transit from the current RRC state to the target RRC state according to received information about the target RRC state. The current RRC state may be a CELL_FACH state. The UE may further update a current RNTI with the target RNTI.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

In addition, in this embodiment of the present invention, the user equipment can directly perform state transition without waiting for an instruction that is sent by an RNC in a reconfiguration process.

Figure 11:
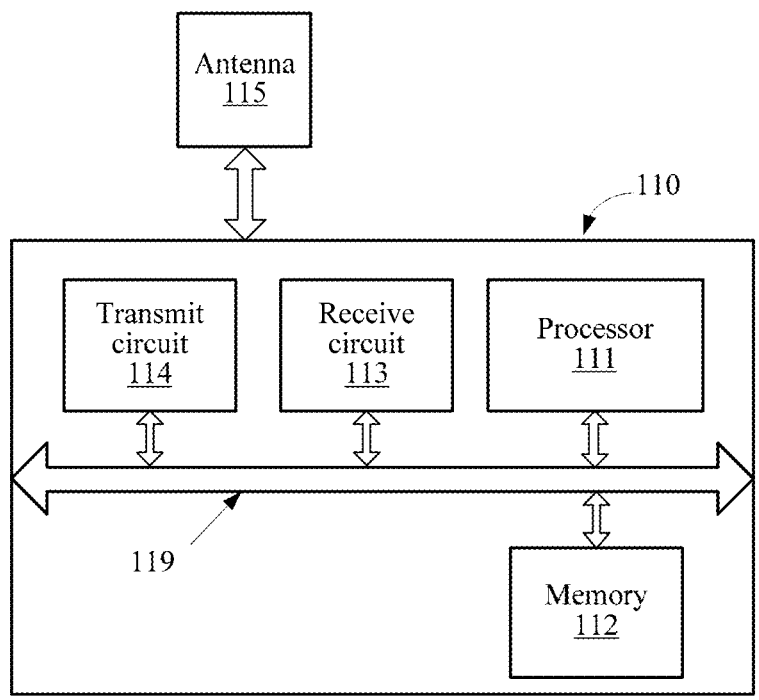
FIG. 11 is a schematic block diagram of user equipment according to another embodiment of the present invention.

FIG. 11 is a schematic block diagram of user equipment according to another embodiment of the present invention. The user equipment 110 in FIG. 11 may be used to implement the steps and methods in the foregoing method embodiments. The user equipment 110 in FIG. 11 includes a processor 111, a memory 112, a receive circuit 113, and a transmit circuit 114. The processor 111, the memory 112, the receive circuit 113, and the transmit circuit 114 are connected by using a bus system 119.

In addition, the user equipment 110 may further include an antenna 115 and the like. The processor 111 controls an operation of the user equipment 110. The memory 112 may include a read-only memory and a random access memory, and provide an instruction and data to the processor 111. A part of the memory 112 may also include a non-volatile random access memory (NVRAM). In a specific application, the transmit circuit 114 and the receive circuit 113 may be coupled to the antenna 115. The components of the user equipment 110 are coupled together by using the bus system 119, where the bus system 119 not only includes a data bus, but also includes a power bus, a control bus, and a status signal bus. However, to make the description clear, the various types of buses are all marked as the bus system 119 in the figure.

The processor 111 may be an integrated circuit chip and have a signal processing capability. The processor 111 may be a general-purpose processor, a digital signal processor (DSP), an application-specific integrated circuit (ASIC), a field programmable gate array (FPGA), or another programmable logic device, a discrete gate, a transistor logic device, or a discrete hardware component. The processor 111 may implement or execute methods, steps, and logical block diagrams disclosed in the embodiments of the present invention. The general purpose processor may be a microprocessor or the processor may be any conventional processor or the like. The processor 111 reads information in the memory 112, and controls the components of the user equipment 110 in combination with hardware of the user equipment 110.

The methods in FIG. 4 and FIG. 5 may be implemented in the user equipment 110 in FIG. 11. To avoid repetition, details are not described again.

Specifically, under control of the processor 111, the user equipment 110 completes the following operations: receiving state transition indication information and information about a target RRC state that are sent by a radio network controller (RNC), where the state transition indication information is used for instructing the user equipment to perform enhanced state transition; and transiting from a current RRC state to the target RRC state according to the state transition indication information.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

Optionally, in another embodiment, the enhanced state transition is state transition performed in an enhancement mode, and the processor 111 may directly enable, in the enhancement mode, the user equipment 110 to transit from the current RRC state to the target RRC state when the state transition indication information is received.

Optionally, in another embodiment, the transmit circuit 114 may send radio link control acknowledgement information to the RNC before the processor 111 enables the user equipment 110 to transit from the current RRC state to the target RRC state according to the state transition indication information.

Optionally, in another embodiment, the transmit circuit 114 may send, to the RNC before the processor 111 enables the user equipment 110 to transit from the current RRC state to the target RRC state according to the state transition indication information, signaling connection release indication information carrying an information element, wherein the information element represents that a signaling connection release indication cause is set to user equipment requested packet switch data session end.

Optionally, in another embodiment, the receive circuit 113 may receive radio link control acknowledgement information that is sent by the RNC according to the signaling connection release indication information.

Optionally, in another embodiment, the state transition indication information is carried by a bit.

Optionally, in another embodiment, the receive circuit 113 may receive reconfiguration signaling sent by the RNC. The reconfiguration signaling carries the state transition indication information and the information about the target RRC state.

Optionally, in another embodiment, the receive circuit 113 may receive reconfiguration signaling or a broadcast message sent by the RNC. The reconfiguration signaling or the broadcast message carries the state transition indication information, and the state transition indication information includes the information about the target RRC state.

Optionally, in another embodiment, the receive circuit 113 may receive a target radio network temporary identifier sent by the RNC, and the processor 111 may update a current radio network temporary identifier with the target radio network temporary identifier.

Figure 12:
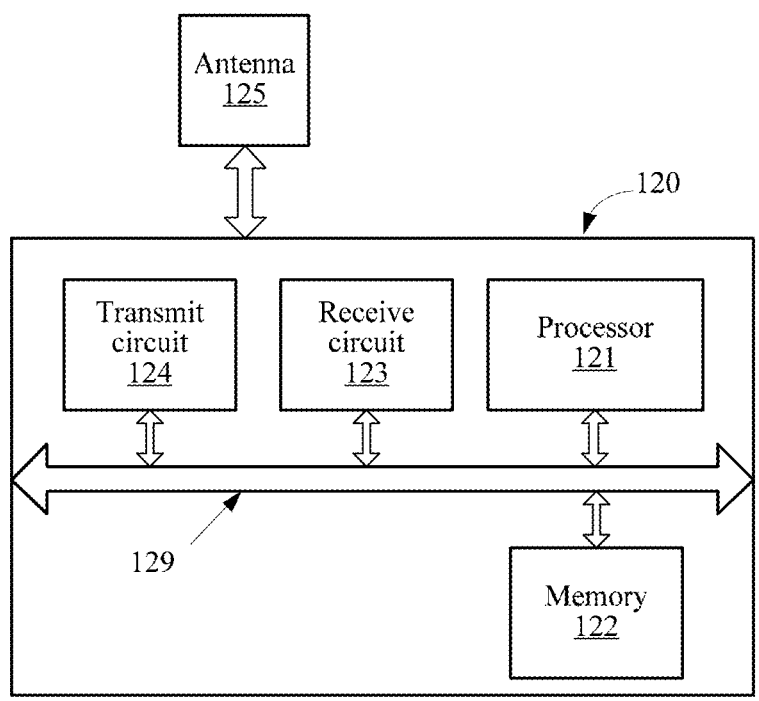
FIG. 12 is a schematic block diagram of a radio network controller according to another embodiment of the present invention.

FIG. 12 is a schematic block diagram of a radio network controller according to another embodiment of the present invention. The radio network controller 120 in FIG. 12 may be used to implement the steps and methods in the foregoing method embodiments. The radio network controller 120 in FIG. 12 includes a processor 121, a memory 122, a receive circuit 123, and a transmit circuit 124. The processor 121, the memory 122, the receive circuit 123, and the transmit circuit 124 are connected by using a bus system 129.

In addition, the radio network controller 120 may further include an antenna 125 and the like. The processor 121 controls an operation of the radio network controller 120. The memory 122 may include a read-only memory and a random access memory, and provide an instruction and data to the processor 121. A part of the memory 122 may also include a non-volatile random access memory (NVRAM). In a specific application, the transmit circuit 124 and the receive circuit 123 may be coupled to the antenna 125. The components of the radio network controller 120 are coupled together by using the bus system 129. The bus system 129 not only includes a data bus, but also includes a power bus, a control bus, and a status signal bus. However, to make the description clear, the various types of buses are all marked as the bus system 119 in the figure.

The processor 121 may be an integrated circuit chip and have a signal processing capability. The processor 121 may be a general-purpose processor, a digital signal processor (DSP), an application-specific integrated circuit (ASIC), a field programmable gate array (FPGA), or another programmable logic device, a discrete gate, a transistor logic device, or a discrete hardware component. The processor 121 may implement or execute methods, steps, and logical block diagrams disclosed in the embodiments of the present invention. The general purpose processor may be a microprocessor or the processor may be any conventional processor or the like. The processor 121 reads information in the memory 122, and controls the components of the radio network controller 120 in combination with hardware of the radio network controller 120.

The method in FIG. 6 may be implemented in the radio network controller 120 in FIG. 12. To avoid repetition, details are not described again.

Specifically, under control of the processor 121, the radio network controller 120 performs the following operations: generating state transition indication information and information about a target radio resource control (RRC) state, where the state transition indication information is used for instructing user equipment to perform enhanced state transition; and sending the state transition indication information and the information about the target RRC state to the user equipment, so that the user equipment transits from a current RRC state to the target RRC state according to the state transition indication information.

In this embodiment of the present invention, state transition indication information and a target RRC state are used to instruct user equipment to directly transit from a current RRC state to the target RRC state in an enhancement mode. In this embodiment of the present invention, when the user equipment performs enhanced state transition, no reconfiguration process or reconfiguration process optimization is required, avoiding relatively high signaling consumption caused by multiple reconfiguration processes. Therefore, signaling overheads required during state transition can be reduced.

Optionally, in another embodiment, the receive circuit 123 may receive radio link control acknowledgement information that is sent by the user equipment before transiting from the current RRC state to the target RRC state.

Optionally, in another embodiment, the receive circuit 123 may receive signaling connection release indication information carrying an information element sent by the user equipment before transiting from the current RRC state to the target RRC state, wherein the information element represents that a signaling connection release indication cause to user equipment requested packet switch data session end.

Optionally, in another embodiment, the transmit circuit 124 may send radio link control acknowledgement information to the user equipment according to the signaling connection release indication information.

Optionally, in another embodiment, the state transition indication information is carried by a bit.

Optionally, in another embodiment, the transmit circuit 124 may send reconfiguration signaling to the user equipment. The reconfiguration signaling carries the state transition indication information and the information about the target RRC state.

Optionally, in another embodiment, the transmit circuit 124 may send reconfiguration signaling or a broadcast message to the user equipment. The reconfiguration signaling or the broadcast message carries the state transition indication information, and the state transition indication information includes the information about the target RRC state.

Optionally, in another embodiment, the transmit circuit 124 may send a target radio network temporary identifier to the user equipment.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments in any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communications medium. The communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server, or another remote source by using a coaxial cable, an optical fiber/cable, a twisted pair, a digital subscriber line (DSL), or wireless technologies such as infrared ray, radio and microwave, the coaxial cable, optical fiber/cable, twisted pair, DSL, or wireless technologies such as infrared ray, radio, and microwave are included in fixation of a medium to which they belong. For example, a disk and a disc used by the present invention include a compact disc CD, a laser disc, an optical disc, a digital versatile disc (DVD), a floppy disk, and a Blu-ray disc. The disk generally copies data by a magnetic means, and the disc copies data optically by a laser means. The foregoing combination should also be included in the protection scope of the computer-readable medium.

In summary, what is described above is merely example embodiments of the technical solutions of the present invention, but is not intended to limit the protection scope of the present invention. Any modification, equivalent replacement, or improvement made without departing from principle of the present invention shall fall within the protection scope of the present invention.

What is claimed is:

1. User equipment, comprising:
   a transmitter, configured to send uplink radio resource control (RRC) signaling carrying an enhanced state transition capability to a radio network controller (RNC) that indicates that the user equipment can receive state transition indication information and perform state transition according to the state transition indication information;
   a receiver, configured to receive the state transition indication information and information about a target RRC state that are sent by the RNC, wherein the state transition indication information is used for instructing the user equipment to perform enhanced state transition; and
   a processor, configured to enable the user equipment to transit from a current RRC state to the target RRC state according to the state transition indication information.

2. The user equipment according to claim 1, wherein the transmitter is further configured to:
   before the processor enables the user equipment to transit from the current RRC state to the target RRC state, send, to the RNC, signaling connection release indication information carrying an information element, wherein the information element represents that a signaling connection release indication cause is set to a user equipment requested packet switch data session end.

3. The user equipment according to claim 2, wherein the receiver is further configured to receive radio link control acknowledgement information that is sent by the RNC according to the signaling connection release indication information.

4. The user equipment according to claim 1, wherein the receiver is further configured to receive reconfiguration signaling sent by the RNC, and the reconfiguration signaling carries the state transition indication information and the information about the target RRC state.

5. A radio network controller, comprising:
a receiver, configured to receive, from user equipment, uplink radio resource control (RRC) signaling carrying an enhanced state transition capability that indicates that the user equipment can receive state transition indication information and perform state transition according to the state transition indication information;
a processor, configured to generate the state transition indication information and information about a target RRC state, the state transition indication information for instructing user equipment to perform enhanced state transition; and
a transmitter, configured to send the state transition indication information and the information about the target RRC state to the user equipment for transiting from a current RRC state to the target RRC state according to the state transition indication information.

6. The radio network controller according to claim 5, wherein the receiver is further configured to receive signaling connection release indication information carrying an information element sent by the user equipment before transiting from the current RRC state to the target RRC state, wherein the information element represents that a signaling connection release indication cause is set to a user equipment requested packet switch data session end.

7. The radio network controller according to claim 6, wherein the transmitter is further configured to send radio link control acknowledgement information to the user equipment according to the signaling connection release indication information.

8. The radio network controller according to claim 5, wherein the transmitter is further configured to send reconfiguration signaling to the user equipment, and the reconfiguration signaling carries the state transition indication information and the information about the target RRC state.

9. A state transition method, comprising:
sending uplink radio resource control (RRC) signaling carrying an enhanced state transition capability to a radio network controller (RNC) that indicates that user equipment can receive state transition indication information and perform state transition according to the state transition indication information;
receiving the state transition indication information and information about a target RRC state that are sent by the RNC, wherein the state transition indication information is used for instructing the user equipment to perform enhanced state transition; and
transiting from a current RRC state to the target RRC state according to the state transition indication information.

10. The method according to claim 9, wherein before transiting from the current RRC state to the target RRC state according to the state transition indication information, the method further comprises:
sending, to the RNC, signaling connection release indication information carrying an information element, wherein the information element represents that a signaling connection release indication cause is set to a user equipment requested packet switch data session end.

11. The method according to claim 10, further comprising:
receiving radio link control acknowledgement information that is sent by the RNC according to the signaling connection release indication information.

12. The method according to claim 9, wherein receiving the state transition indication information and the information about the target RRC state that are sent by the RNC comprises:
receiving reconfiguration signaling sent by the RNC, wherein the reconfiguration signaling carries the state transition indication information and the information about the target RRC state.

13. A state transition method, comprising:
receiving uplink radio resource control (RRC) signaling carrying an enhanced state transition capability that indicates that user equipment can receive state transition indication information and perform state transition according to the state transition indication information;
generating the state transition indication information and information about a target RRC state, the state transition indication information for instructing the user equipment to perform enhanced state transition; and
sending the state transition indication information and the information about the target RRC state to the user equipment for transiting from a current RRC state to the target RRC state according to the state transition indication information.

14. The method according to claim 13, further comprising:
receiving signaling connection release indication information carrying an information element sent by the user equipment before transiting from the current RRC state to the target RRC state, wherein the information element represents that a signaling connection release indication cause is set to a user equipment requested packet switch data session end.

15. The method according to claim 14, further comprising:
sending radio link control acknowledgement information to the user equipment according to the signaling connection release indication information.

16. The method according to claim 13, wherein sending the state transition indication information and the information about the target RRC state to the user equipment comprises:
sending reconfiguration signaling to the user equipment, wherein the reconfiguration signaling carries the state transition indication information and the information about the target RRC state.

17. A computer program product comprising a non-transitory computer-readable medium storing computer executable instructions, wherein the instructions comprise:
instructions for sending uplink radio resource control (RRC) signaling carrying an enhanced state transition capability to a radio network controller (RNC) that indicates that user equipment can receive state transition indication information and perform state transition according to the state transition indication information;
instructions for receiving state transition indication information and information about a target RRC state that are sent by the RNC, the state transition indication information for instructing the user equipment to perform enhanced state transition; and instructions for transiting from a current RRC state to the target RRC state according to the state transition indication information.

18. The computer program product according to claim 17, wherein the instructions further comprise:

instructions for, before the transiting from the current RRC state to the target RRC state according to the state transition indication information, sending, to the RNC, signaling connection release indication information carrying an information element, wherein the information element represents that a signaling connection release indication cause is set to user equipment requested packet switch data session end.

19. The computer program product according to claim 18, wherein the instructions further comprise:

instructions for receiving radio link control acknowledgement information that is sent by the RNC according to the signaling connection release indication information.

20. The computer program product according to claim 17, wherein the instructions further comprise:

instructions for receiving reconfiguration signaling sent by the RNC,; wherein the reconfiguration signaling carries the state transition indication information and the information about the target RRC state.

* * * * *